(12) United States Patent
Carver et al.

(10) Patent No.: US 6,530,286 B1
(45) Date of Patent: Mar. 11, 2003

(54) METHOD AND APPARATUS FOR MEASURING FLUID FLOW

(76) Inventors: David R. Carver, 3692 E. Bijou St., Colorado Springs, CO (US) 80909; Thomas A. Tait, 12560 Kaibad Ct., Colorado Springs, CO (US) 80908

( * ) Notice: Subject to any disclaimer, the term of this patent is extended or adjusted under 35 U.S.C. 154(b) by 0 days.

(21) Appl. No.: 09/568,871

(22) Filed: May 9, 2000

(51) Int. Cl.[7] ............................ G01F 1/708; G01F 1/68; G01P 3/36
(52) U.S. Cl. ................. 73/861.95; 73/204.14; 356/28
(58) Field of Search ..................... 356/28; 73/861.95, 73/204.14

(56) References Cited

U.S. PATENT DOCUMENTS 4,532,811 A  *  8/1985  Miller et al. ............. 73/861.95

OTHER PUBLICATIONS

Light–Emitting Diodes, S.N. Mohammad et al., in Wiley Encyclopedia of Electrical and Electronics Engineering Online, J. Webster (ed.), http://www.mrw.interscience.wiley.com/eeee/14/6014/W.6014–toc.html, 1999.*

* cited by examiner

*Primary Examiner*—Thomas H. Tarcza
*Assistant Examiner*—Fred H Mull
(74) *Attorney, Agent, or Firm*—Timothy J. Martin; Michael R. Henson; Rebecca A. Gegick

(57) ABSTRACT

The present invention relates to methods and apparatus useful for detecting and measuring flow of a fluid along a flow path. In a method according to the invention, the temperature of a flowing fluid is altered at a selected location for a selected duration so as to generate a pulse in the fluid moving in a downstream direction along a flow path, and the fluid is monitored at a sensing region to detect the pulse passing therethrough. An apparatus according to the present invention may comprise a conduit, a sensor element disposed therein, an energy source proximate to the conduit, and a controller operative to generate an on signal and an off signal respectively operative to activate and deactivate the energy source. The present invention also relates to a liquid chromatography device having a fluid flow detecting and measuring apparatus according to the present invention.

25 Claims, 3 Drawing Sheets

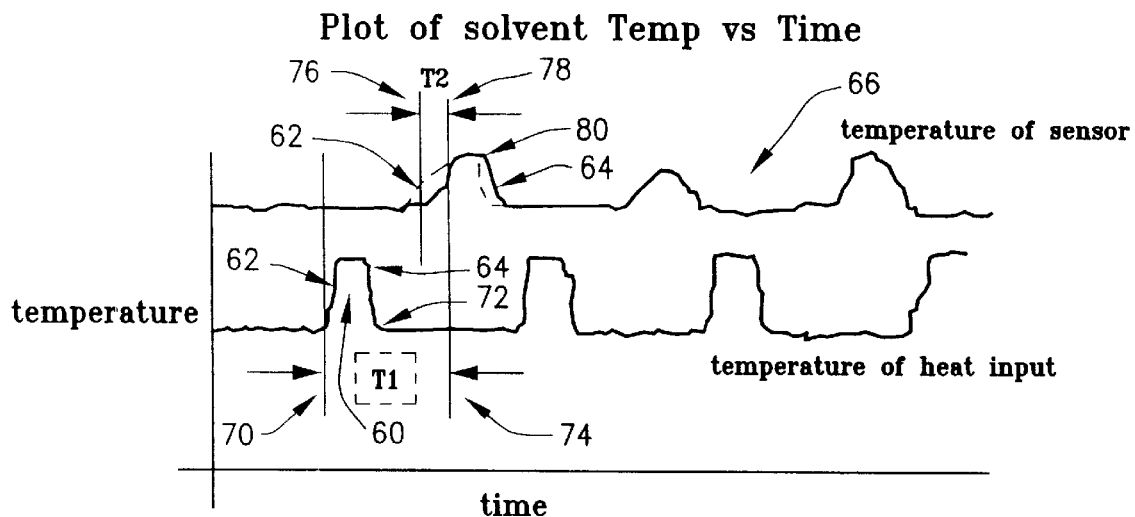
Fig.5
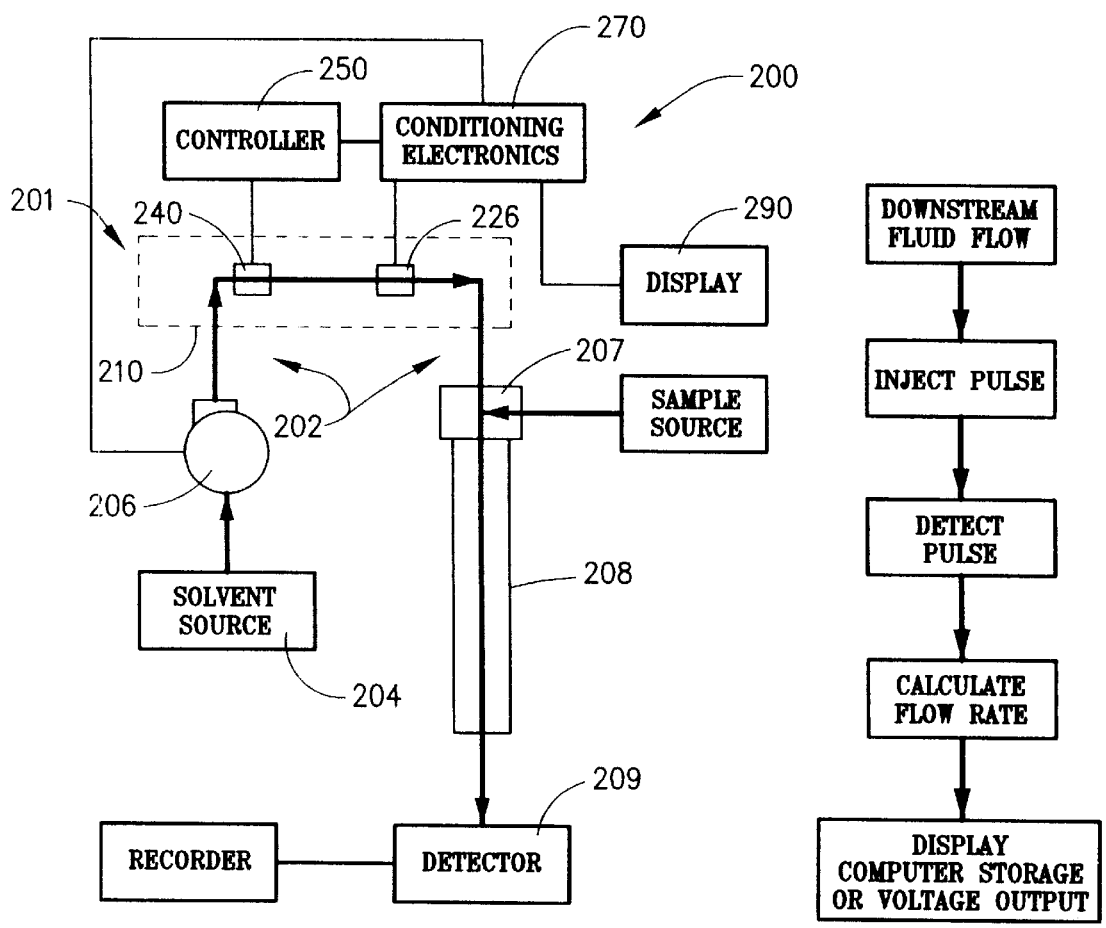
Fig.6
Fig.7

METHOD AND APPARATUS FOR MEASURING FLUID FLOW

FIELD OF THE INVENTION

The present invention generally relates to the detection and measurement of fluid flow rates. More specifically, the present invention is directed to a method particularly adapted for measuring ultra low flows. Additionally, the present invention includes an apparatus useful for measuring ultra low flows in devices such as liquid chromatography columns.

BACKGROUND OF THE INVENTION

Ultra low flow rates of liquids are difficult to detect and measure. However, many state of the art applications and devices now require the use of flow rates that are extremely low. For example, in the course of liquid chromatography (LC) it is necessary to move a liquid through the stationary phase of the column, which is generally accomplished through the use of a wide variety of pumps. In classical high performance liquid chromatography (HPLC), a mechanical pump is commonly used that utilizes a reciprocating piston and check valves. This pumping can work very well down to milliliter per minute flow rates. At lower flow rates, however, the accuracy and precision of the flow can become wildly inaccurate and inconsistent due to a wide variety of factors.

As the state-of-the-art in chromatography is pushed into new realms of performance, the flow rate and size of the chromatography media becomes smaller. We now see needs for flow rates that are in the submilliliter per minute range. In fact, flows as small as 10 nanoliters per minute are becoming necessary. It is extremely difficult to accurately and precisely pump such low flow rates without having an absolute measurement of the flow rate coming out of the pump. Conventional "open loop" indirect methods of determining the flow, however, are subject to many errors, including leakage of liquid around the sealing surface of the piston seal, leakage around the fittings for the tubing, compression of the solvent due to variation in the backpressure on the system, accuracy of the movement of the piston due to friction in the mechanical assembly, and reproducible movement in the check valve during the refill stroke of the system (in the case of multiple stroke piston pumping). Most of these factors can be carefully reduced but not eliminated, and all are subject to change as wear affects the performance of the pump, thus leading to poor precision.

One method for measuring the flow of a moving liquid in a laminar flow cell is to measure the movement of an input, such as a particle, into the liquid. The use of an input particle has certain difficulties, however, since it is often difficult to introduce particles into the flowing stream. Another input parameter that has been used to measure fluid flow rates is the application of constant heat from a resistive heating element to the liquid in a tube at a spot in the fluid flow, then measurement of the temperature of the liquid at a sensor downstream from that point. The cooling effect of the tube produces a decrease in temperature that is proportional to the flow rate for a given liquid, and which is related to the heat retention properties of the given liquid. However, this technology suffers a variety of problems. For example, when using this method to regulate the pumping of a gradient of solvent through a chromatography column, the heat capacity of the solvent constantly changes, which undesirably affects the measured temperature of liquid at the sensor, and accordingly distorts the flow rate measurement.

Accordingly, there remains a need to provide a new and improved method and apparatus for measuring fluid flow rates, and ultra low flow rates in particular. The present invention is directed to meeting these needs.

SUMMARY OF THE INVENTION

It is an object of the present invention to provide a new and useful apparatus for measuring fluid flow rates.

It is another object to provide an inexpensive apparatus particularly adapted to measuring extremely low flow rates of a fluid.

It is yet another object to provide an apparatus useful for measuring ultra low flow rates that can be easily incorporated into existing equipment.

Another object of the present invention is to provide a simple and efficient method for measuring flow rates of a fluid.

A still further object is to provide a method for measuring fluid flow rates that can be used with an apparatus according to the present invention.

Yet another object is to provide a liquid chromatography device incorporating the apparatus of the present invention for measuring fluid flow rates therein.

According to the present invention, a method for detecting and measuring flow of a fluid along a flow path is provided. The method comprises moving the fluid in a downstream direction along a flow path, altering the temperature of the fluid at a selected location for a selected duration so as to generate a pulse in the fluid having a leading edge forming a first temperature gradient and a trailing edge forming a second temperature gradient, and monitoring the fluid at a sensing region that is spaced apart and downstream of the selected location, thereby to detect the pulse passing through the sensing region.

The step of altering the temperature of the fluid may be accomplished by heating the fluid at the selected location, such as by transmitting electromagnetic radiation of a selected frequency into the fluid, by passing electrical current through a resistive element that is proximate to the selected location, or by acoustically vibrating the fluid. The selected duration is preferably between 10% and 20% of the time between the step of altering the temperature and the time at which the pulse is detected. The step of altering the temperature is preferably repeated so as to generate a plurality of pulses in the fluid. The step of monitoring the fluid may be accomplished by measuring a relative temperature of the fluid using a sensor element, such as a thermistor, or by measuring the refractive index of the fluid. The pulse may be detected as a temperature gradient indicative of the pulse, such as the first temperature gradient or the second temperature gradient formed during the step of altering the temperature of the fluid.

The method may further include the step of altering a signal from the sensor element, such as by analog to digital conversion or by analog amplification, and further by band-pass filtering the signal. A flow rate of the fluid may be calculated by dividing a known volume of the fluid, in particular the volume of fluid between the selected location and the sensing region, by a time interval measured from the step of altering the temperature to detection of the pulse. A thermal lag interval may be subtracted from the time interval.

The present invention also provides an apparatus for detecting and measuring a flow rate of a fluid. The apparatus comprises a conduit sized and adapted to receive a selected volume of the fluid, a sensor element disposed in the conduit, an energy source proximate to the conduit and operative to transmit energy through a portion of a sidewall of the conduit at a spaced apart location from the sensor element, and a controller operative to generate an on signal and an off signal. The on signal is operative to activate the energy source for a first selected duration, and the off signal is operative to deactivate the energy source for a second selected duration.

The portion of the sidewall may be transparent, and the energy source operative to transmit electromagnetic radiation therethrough. The surrounding sidewall may further include an energy-absorbing portion proximate to the spaced apart location, and an energy-reflecting portion adjacent the energy absorbing portion. The energy source may be a light emitting diode, a LASER, a tungsten bulb, and the like, and may further include a lens operative to focus the electromagnetic radiation. The energy source may alternatively be a resistive element, such as a nichrome wire or a polyimide backed heating element. The sensor element may be a thermistor, or the like. The on signal and off signal may be intermittently generated by said controller so as to form a plurality of intermittent pulses in the fluid.

The present invention also provides a liquid chromatography device having a pump in fluid communication with a mobile phase flow path and operative to pump a fluid therealong, and a fluid flow detecting and measuring apparatus according to the present invention having a conduit in fluid communication with the mobile phase flow path, a sensor element disposed in the conduit, an energy source proximate to the conduit, and a controller operative to generate an on signal and an off signal.

The present invention additionally provides a method for detecting and measuring flow of a fluid along a flow path, which comprises moving the fluid in a downstream direction along a flow path, periodically altering the characteristics of the fluid at a selected location for a selected duration, thereby to generate a plurality of disturbances in the fluid moving in a downstream direction along the flow path, monitoring the fluid at a sensing region that is spaced apart and downstream of the selected location, thereby to detect the disturbances passing through the sensing region, and calculating a flow rate of the fluid based on a known volume of the fluid between the selected location and the sensing region and a time interval determined by generation and detection of a selected disturbance.

The step of altering the characteristics of the fluid may be accomplished by heating the fluid, cooling the fluid or injecting a particle into the fluid, such as a radioisotope or spectrophotometrically detectable compound. The calculated flow rate may be based on averaging a plurality of time intervals determined by generation and detection of selected disturbances.

These and other objects of the present invention will become more readily appreciated and understood from a consideration of the following detailed description of the exemplary embodiment of the present invention when taken together with the accompanying drawings, in which:

BRIEF DESCRIPTION OF THE DRAWINGS

FIG. 5 is a graph plot of solvent temperature versus time;

FIG. 6 is a diagrammatic view of a liquid chromatography column incorporating the apparatus of the present invention; and FIG. 7 is a flowchart of an exemplary method according to the present invention.

DETAILED DESCRIPTION OF THE EXEMPLARY EMBODIMENTS

The present invention is directed to a unique method for detecting fluid flow rates, and to an apparatus useful with the method of the present invention. The method and apparatus of the present invention are particularly adapted for use in detecting extremely low fluid flow rates. As described above, the use of a resistive heating element to measure flow rates has presented particular problems in the past, such as variations in the heat capacity of the solution creating uncertainty in the use of temperature measurements downstream of the constant heat input. We determined that the parameter we really want to measure is the amount of time it takes for the heat input into the liquid to reach the temperature sensor, such that a heat pulse is really the desired input into the liquid.

Accordingly, the present invention provides a unique method for measuring fluid flow rates, which involves generating a disturbance in a fluid by altering the characteristics of the fluid, such as by injecting a heat pulse or particle into the fluid, and measuring the time for the disturbance to move a known downstream distance. The method is particularly adapted for use with an apparatus having an energy source and a sensor operative, respectively, to generate and detect the disturbance. While standard thermal energy sources, such as heating elements, may be utilized to inject a heat pulse into a fluid flowing through a conduit, a more precise method of generating a defined heat pulse was desired. Accordingly, the present invention provides a preferred apparatus that incorporates an energy source that can be focused to produce a particularly defined pulse in the fluid, such that a very precise measurement of the fluid flow rate can be made.

Figure 1:
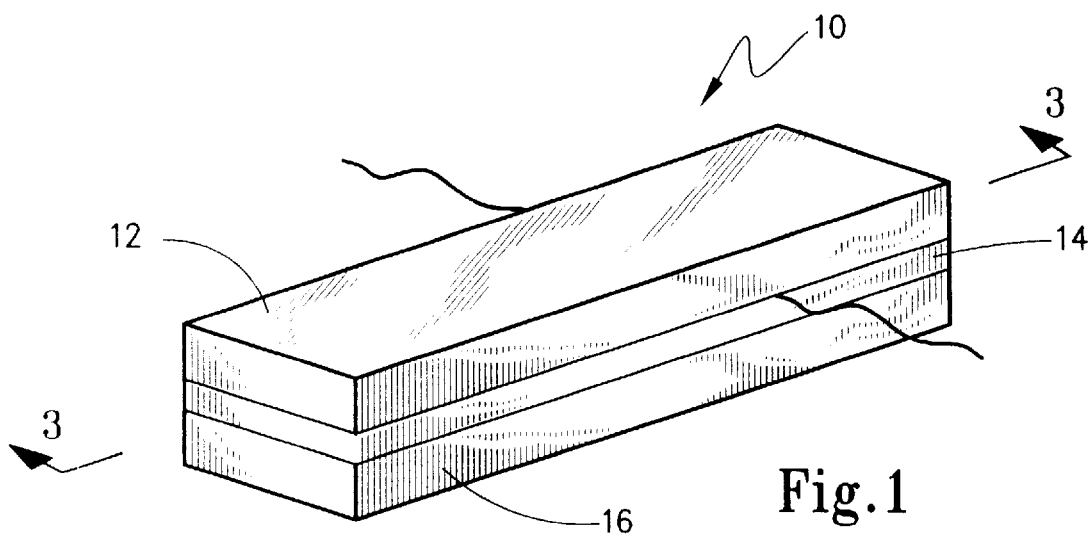
FIG. 1 is a perspective view of a portion of an apparatus according to the present invention.

Turning to FIG. 1, a preferred embodiment of the apparatus according to the present invention includes a conduit body 10 defining a conduit through which a fluid flows in a downstream direction along a flow path. The conduit body 10 is preferably formed of a multiple-piece assembly having a transparent body 12, gasket 14 and fluid contact body 16, which are preferably held together by external fixtures such as clamps or by internal fixtures such as screws, as known in the art. Transparent body 12 may be formed of any suitable inert transparent material operative to transmit light therethrough, such as glass. Gasket material 14 may be an inert material suitable for forming gaskets as known in the art, such as a fluorinated ethylene propylene copolymer. Fluid contact body 16 may be formed of a non-porous inert material such as polyethylene terephthalate, stainless steel, or titanium.

Figure 2:
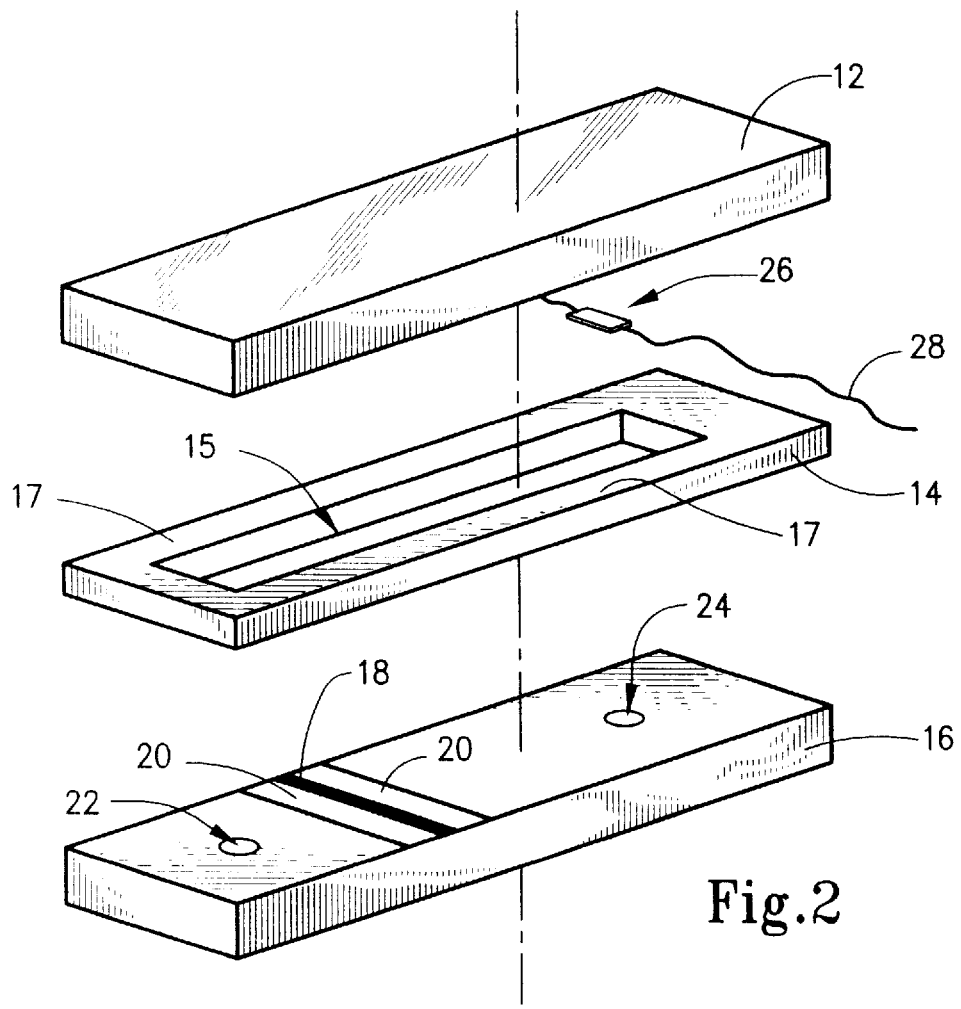
FIG. 2 is an exploded perspective view of the apparatus portion of FIG. 1.

As shown in FIG. 2, gasket 14 includes a channel 15 formed therethrough. Channel 15 may extend longitudinally along gasket 14, such that gasket sidewall 17 extends around channel 15. Fluid contact body 16 preferably includes a band of a dark colored material 18 operative to absorb energy, bounded by reflective areas 20 operative to reflect energy. Dark colored material 18 may be glassy carbon, ceramic, or other inert materials that can be deposited on fluid contact body 16 such as by anodizing, as known in the art. It is desirable that dark colored material 18 be adapted to increase in temperature upon absorption of energy, such as light energy. Reflective areas 20 may be formed by polishing fluid contact body 16 at areas adjacent dark colored material 18, thereby to create highly polished and reflective surface areas of fluid contact body 16 which are operative to reflect light energy. Fluid contact body 16 also includes inlet aperture 22 and outlet aperture 24 formed therethrough, such as by boring or molding holes through fluid contact body 16. A sensor element 26 having leads 28, is preferably interposed between transparent body 12 and gasket 14, such that sensor element 26 sits within channel 15 while leads 28 extend exteriorly of conduit body 10.

Figure 3:
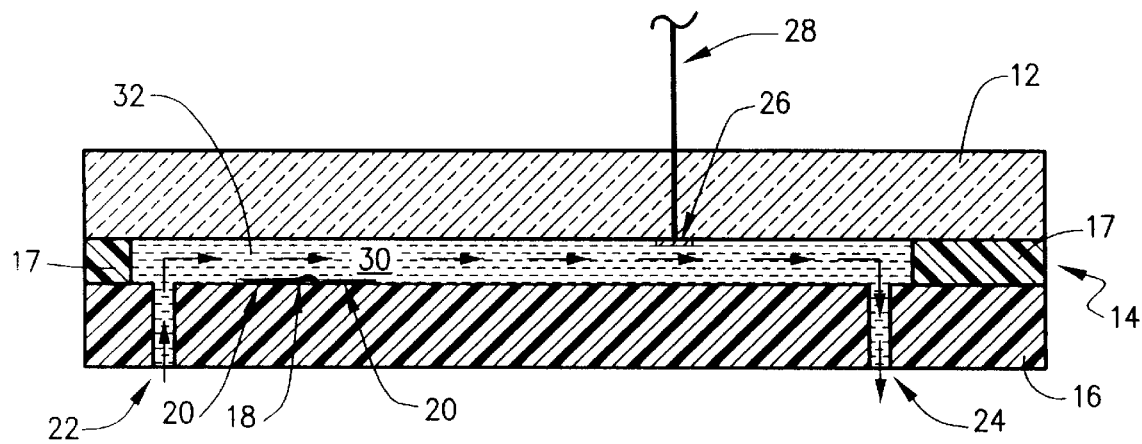
FIG. 3 is a side view in cross-section of the apparatus portion shown in FIG. 1.

As shown in FIG. 3, conduit body 10 thus forms a conduit 30 that is sized and adapted to receive a selected volume of fluid 32 and which can be placed along a fluid flow path, such that fluid 32 moves in a downstream direction through inlet aperture 22, along conduit 30 and through outlet aperture 24. Fluid 32 can be pumped by a pump in fluid communication with the conduit 30, as known in the art. It should be apparent that conduit 30 is defined by a sidewall consisting of transparent body 12, gasket 14 and fluid contact body 16. In particular, it should be noted that a portion of the sidewall formed by transparent body 12 is capable of passing therethrough thermal energy, and in particular electromagnetic radiation of a frequency in the visible spectrum, approximately 380 nm to 780 nm.

The operation of an apparatus according to the present invention is apparent with reference to FIG. 4, which shows an apparatus 100 for detecting and measuring a flow rate of a fluid according to the present invention, wherein apparatus 100 includes conduit body 10, as described with reference to FIGS. 1–3, an energy source 40, and a controller 50. In the preferred embodiment, energy source 40 includes a light emitting diode 42 and a lens 44 operative to focus electromagnetic radiation 46 emitted by light emitting diode 42. It should be appreciated that other energy sources may be used which are operative to transmit thermal energy, and visible light in particular, through transparent body 12. For example, energy source 40 may be a light emitting device, such as a LASER or tungsten bulb, or a resistive element, such as a nichrome wire, a polyimide backed heating element, or the like. Alternatively, devices utilizing other methods for inducing heat, such as acoustic vibrations, may be provided as energy source 40. It has been found that a minimal temperature increase in fluid 32 is sufficient, such that devices which heat fluid 32 by as little as 0.01° C. may be utilized.

Figure 4:
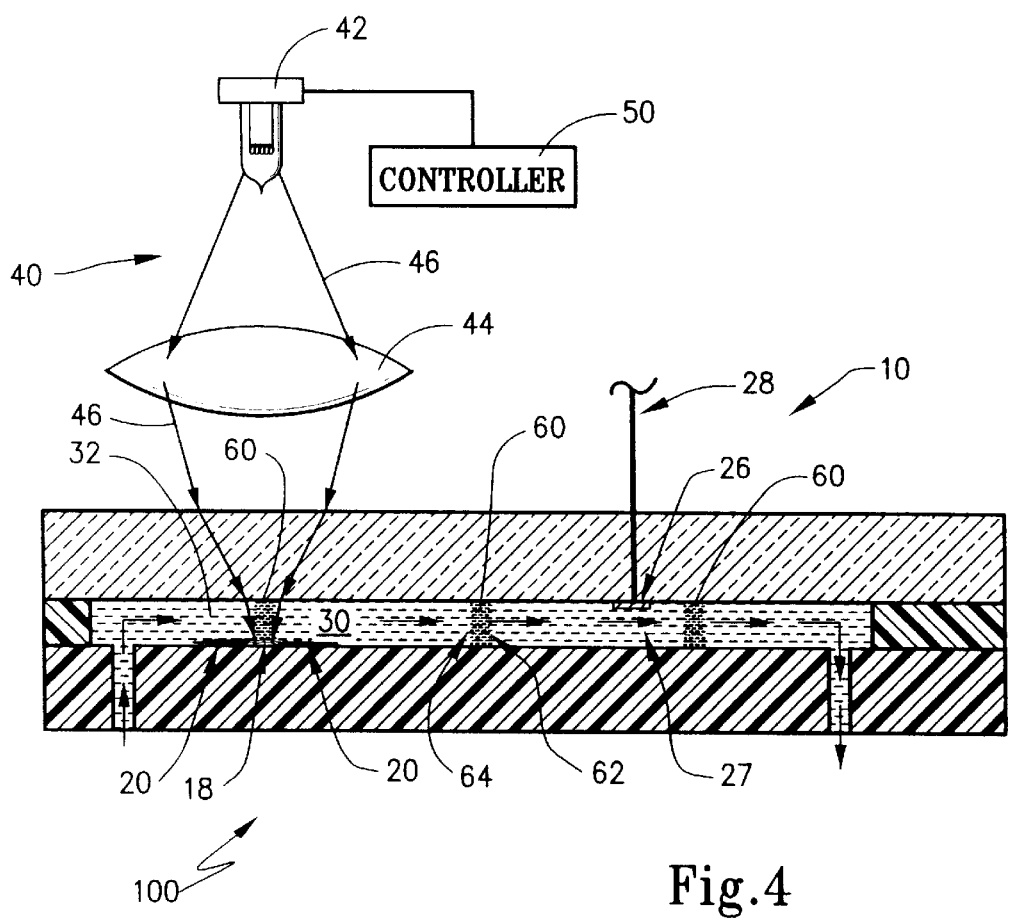
FIG. 4 is a diagrammatic view showing a controller and energy source in combination with the apparatus portion shown in FIG. 3.

As shown in FIG. 4, light emitting diode 42 and lens 44 operate in combination with dark colored material 18 and reflective areas 20 to produce a particularly definite heat pulse 60 in fluid 32 by altering the temperature of fluid 32 for a selected duration. In particular, dark colored material 18 absorbs electromagnetic radiation 46 from energy source 40 thereby increasing in temperature, whereas reflective areas 20 reflect electromagnetic radiation 46 such that reflective areas 20 do not generally increase in temperature. Portions of fluid 32 that pass across dark colored material 18 while energy source 40 is operative become heated. Intermittent activation and deactivation of energy source 40 creates a heat pulse 60 in fluid 32, wherein heat pulse 60 has a leading edge 62 and a trailing edge 64 each forming a temperature gradient, respectively. In particular, leading edge 62 is created upon activation of energy source 40 which forms a first temperature gradient going from decreased to increased temperature as fluid flows across dark colored material 18. Trailing edge 64 is created upon deactivation of energy source 40 which forms a second temperature gradient going from increased to decreased temperature as fluid flows across dark colored material 18. Repeated activation and deactivation of energy source 40 creates a plurality of heat pulses 60 in fluid 32, each heat pulse 60 moving in a downstream direction through conduit 30 as fluid 32 flows therethrough. It should be appreciated that each heat pulse 60 moves downstream at a rate that is directly proportional to the rate of fluid flow of fluid 32 in a laminar flow.

Controller 50 may be used to generate signals operative to activate and deactivate energy source 40. In particular, controller 50 may generate an on signal that is operative to activate energy source 40 for a selected duration and an off signal that is operative to deactivate energy source 40 for another duration. It is preferred that the on signal activates energy source 40 for a duration of between 10% and 20% of the time it takes a pulse 60 to travel from a location proximate to dark colored band 18 to a sensing region 27 that is proximate to sensor element 26. That is, it is preferred that energy source 40 is activated for 10% to 20% of a time interval between a first time at which the temperature of fluid 32 is altered to form leading edge 62 and a second time at which leading edge 62 reaches sensor element 26. Controller 50 may be a computer or other timing device as known in the art.

It should be appreciated that the accuracy with which a flow rate is measured may be dependent upon the frequency with which pulses 60 are created in conduit 30. At low flow rates, for example, pulses 60 may be generated at a frequency such that one or two pulses 60 are present at a given time between the heating location and the sensing region 27, as shown in FIG. 4. At higher flow rates, however, it is desirable that the frequency of pulse generation be increased, to improve the accuracy of the calculated flow rate. For example, at a flow rate of 50 mL/min, pulses 60 may be generated at a frequency such that between ten and fifty pulses 60 are present at a given time between the heating location and the sensing region 27. It is further desirable that pulses 60 are generated regularly and periodically such that pulses 60 are evenly spaced apart in conduit 30 when the flow rate of fluid 32 is constant. The duration of time for which energy source 40 is activated may be modified as necessary to accommodate the desired frequency at which pulses 60 are generated. That is, the size of a pulse 60 between leading edge 62 and trailing edge 64, as well as the frequency at which pulses 60 are generated, may be adjusted as necessary by modifying the durations between activation and deactivation of energy source 40 and between deactivation and activation of energy source 40, respectively.

Upon reaching sensing region 27, each heat pulse is detected by sensor element 26, such as by measuring relative temperature changes of fluid 32 passing through sensing region 27. It is preferred that sensor element 26 is a thermistor of approximate dimensions 0.010" by 0.005", with 0.0004" platinum leads 28 attached thereto. Such a thermistor is capable under normal activation conditions of detecting heat changes in fluid 32 that are as small as 0.01° C. Alternatively, sensor element 26 may be a platinum element, or a device utilizing other methods of detecting pulse 60, such as refractive index changes in fluid 32 due to the slight temperature changes as each pulse 60 passes through sensing region 27, or laser detected thermal changes utilizing a device similar to an interferometric sensor. Leads 28 attached to sensor element 26 may be connected to various forms of signal receiving equipment as known in the art.

FIG. 5 demonstrates the changes in the temperature of fluid 32 as pulses 60 are generated relative to the changes in the temperature of fluid 32 as it passes through sensing region 27, as indicated by an exemplary signal 66 received from sensor element 26. It should be noted that the graph of temperature at the pulse generation location and the graph of temperature detected at the sensing region 27 are offset in FIG. 5 for the sake of clarity.

In the preferred embodiment, when energy source 40 is activated at a first time 70, the temperature of fluid 32 at the pulse generation location increases to create leading edge 62 of pulse 60. The temperature of fluid 32 remains increased until energy source 40 is deactivated at a later time 72, thereby creating trailing edge 64. As each pulse 60 moves downstream and through sensing region 27, the temperature of fluid 32 in sensing region 27 rises and falls, as detected by sensor element 26 and indicated by signal 66 received from sensor element 26. Leading edge 62 of pulse 60 is detected passing through sensing region 27 at approximately a second time 74, thereby to give a time T1 between generation and approximate detection of leading edge 62 of pulse 60.

Because flow of fluid 32 is laminar, pulse 60 expands as it moves downstream, such that leading edge 62 of pulse 60 may not be uniformly vertical as it passes through sensing region 27. Accordingly, it is desirable to approximate the passing of leading edge 62 through sensing region 27. This is preferably accomplished by determining a thermal lag time T2, which is measured from the initial detection of increased temperature in fluid 32 at a time 76 to a percentage, preferably 50%, response of the sensor element, measured at a time 78, to the absolute measurement 80 of heat in the pulse. Because the identification of time 78 for a given pulse 60 requires reference to a selected percentage of the highest measurement of temperature detected for that pulse, it should be appreciated that time 78 is determined after the given pulse has passed through sensing region 27. Alternatively, time 78 for a given pulse 60 may be identified with reference to a percentage of the highest measurement of temperature in a previous pulse or an average of previous pulses.

The flow rate of the fluid can then be calculated by dividing the known volume of the fluid path, measured from the heating region where leading edge 62 is initially generated to the sensing region 27, by the time interval between generation and detection of pulse 60. The known volume can by calculated by multiplying the cross-section of conduit 30 by the distance between the location at which leading edge 62 is generated and the location at sensing region 27 where leading edge 62 is detected. Because of the laminar flow characteristics of fluid 32, thermal lag time T2 is preferably first subtracted from the time interval, prior to dividing the time interval into the known volume when calculating the flow rate of fluid 32.

That is, the flow rate may be calculated as follows:

$$F = V/(T2-T1)$$

where F is the flow rate of the fluid 32, V is the known volume of fluid between the locations at which the pulse is generated and detected, respectively, T1 is the time interval from generation of leading edge 62 of a pulse 60 to detection of leading edge 62 by sensor element 26 with no thermal lag, and T2 is the thermal lag time from initial detection of leading edge 62 by sensor element 26 to a percentage, such as 50%, response of the sensor element 26 to the absolute measurement of heat in pulse 60. As demonstrated by the above equation, the inverse of flow rate is linearly dependent upon the amount of time it takes the pulse 60 to reach the sensor element 26.

The calculation of the fluid flow rate is preferably automated by the utilization of conditioning electronics to measure the output of signal 66 from sensor element 26, as known in the art. In particular, it is desirable that signal 66 is altered, such as by analog to digital conversion or analog amplification. An appropriate conversion sampling rate may be selected, as known in the art, based on the frequency at which pulses 60 are generated in conduit 30. Signal 66 may additionally be bandpass filtered, as known in the art. For example, when sensor element 26 is a thermistor, signal 66 may be measured as a voltage which can undergo analog to digital conversion and thereafter be bandpass filtered. The time between generation of leading edge 62 to its detection at sensor element 26 may be compared to determine flow rate. Alternatively, signal 66 may undergo analog amplification and bandpass filtering, and thereafter be passed through an AC amplifier to give the flow rate as an amplitude of voltage. As a further alternative, signal 66 may undergo analog amplification, and the pulses may be digitally counted and divided by a time reference either digitally or by analog methods.

As shown in FIG. 6, the present invention also contemplates a liquid chromatography device 200 utilizing a fluid flow detecting and measuring apparatus 201 according to the present invention. Here, a mobile phase flow path 202 runs from a solvent source 204 through a pump 206 and through a chromatography column 208. Apparatus 201 is placed along flow path 202, thereby to detect and measure a flow rate of fluid moving along flow path 202. In particular, a conduit 210, similar to conduit 30 shown with respect to FIGS. 2 and 3, is in fluid communication with flow path 202. It should be appreciated that, while apparatus 201 is preferably placed in the flow path 202 prior to the sample injection head 207 and column 208, other relative placements of apparatus 201 are contemplated, such as after column 208, or after detector 209. It should also be appreciated that a liquid chromatography column according to the present invention may include a mixer when a multi-solvent system is used, in which case apparatus 201 is preferably placed after the mixer in flow path 202, and prior to sample injection head 207.

An energy source 240 is proximate to conduit 210 and a sensor element 226 is disposed in conduit 210. Controller 250 is operative to generate an on signal and an off signal thereby to activate and deactivate, respectively, energy source 240. Conditioning electronics 270 are in electronic communication with sensor element 226 and controller 250 and are operative to calculate a flow rate of fluid along flow path 202. Conditioning electronics 270 may further be in electronic communication with pump 206 and may be operative to control pump 206 thereby to maintain a desired flow rate of fluid along flow path 202. Conditioning electronics 270 may additionally be in electronic communication with a display 290 for providing information relating the fluid flow rate, or alternatively with a voltage output, computer storage or the like.

As depicted in FIG. 7, the apparatus of the present invention lends itself to a method for detecting and measuring the flow of a fluid along a flow path. The method generally includes the steps of moving the fluid in a downstream direction along a flow path, such as through a conduit; altering the temperature of the fluid, such as by injecting a heat pulse into the fluid; and detecting the pulse as it passes through a downstream location, such as a sensing region, where the fluid may be monitored. A flow rate may then be calculated, based on a known volume of the fluid and the time for that known volume to move along the flow path, as measured by generation and detection of the pulse. Information relating to the fluid flow rate may be sent to a display, computer storage, voltage output or the like.

The method may more broadly include the steps of periodically altering the characteristics of the fluid, such as by heating, cooling or injecting a particle, so as to create a number of distinct disturbances in the fluid that are each moving downstream along the flow path; monitoring the fluid at a downstream location in a manner capable of detecting the disturbances; and calculating a flow rate of the fluid based on the volume of fluid between the locations at which the disturbances are generated and detected, and the time between generation and detection of a given disturbance. It should also be appreciated that the flow rate calculation for a given point in time may be based on an average time interval calculated by averaging several time intervals measured between respective generation and detection of a successive number of disturbances.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

What is claimed is:

1. An apparatus for detecting and measuring a flow rate of a fluid, comprising:
   (a) a conduit sized and adapted to receive a selected volume of the fluid, said conduit defined by a surrounding sidewall having a portion thereof that is transparent to electromagnetic radiation of a frequency in the visible spectrum;
   (b) a sensor element disposed in said conduit;
   (c) an energy source proximate to said conduit and operative to transmit electromagnetic radiation of a frequency in the visible spectrum through said portion of said sidewall at a spaced apart location from said sensor element; and
   (d) a controller operative to generate an on signal and an off signal, said on signal operative to activate said energy source for a first selected duration, and said off signal operative to deactivate said energy source for a second selected duration.

2. An apparatus according to claim 1 wherein said energy source is selected from the group consisting of a light emitting diode, a LASER and a tungsten bulb.

3. An apparatus according to claim 2 wherein said energy source includes a lens operative to focus said electromagnetic radiation.

4. An apparatus according to claim 1 wherein said surrounding sidewall includes an energy-absorbing portion thereof that is proximate to said spaced apart location.

5. An apparatus according to claim 4 wherein said surrounding sidewall includes an energy-reflecting portion adjacent said energy-absorbing portion.

6. An apparatus according to claim 1 wherein said sensor element is a thermistor.

7. An apparatus according to claim 1 wherein said controller is operative to intermittently generate said on signal and said off signal.

8. A method for detecting and measuring flow of a fluid along a flow path, comprising:
   (a) moving the fluid in a downstream direction along a flow path;
   (b) altering the temperature of the fluid at a selected location for a selected duration so as to generate a pulse in the fluid, said pulse having a leading edge forming a first temperature gradient and a trailing edge forming a second temperature gradient, said pulse moving in a downstream direction along said flow path;
   (c) monitoring the fluid at a sensing region that is spaced apart and downstream of said selected location, thereby to detect said pulse passing through said sensing region; and
   (d) wherein the step of altering the temperature occurs at a first time and said pulse is detected passing through said sensing region at a second time, and wherein said selected duration is between 10% and 20% of a time Interval between said first time and said second time.

9. A method according to claim 8 wherein the step of altering the temperature of the fluid is accomplished by heating the fluid at said selected location.

10. A method according to claim 8 wherein the step of altering the temperature of the fluid is accomplished by transmitting electromagnetic radiation of a selected frequency into the fluid at said selected location.

11. A method according to claim 10 wherein said electromagnetic radiation is of a frequency in the visible spectrum.

12. A method according to claim 8 wherein the step of altering the temperature is accomplished by passing electrical current through a resistive element that is proximate to said selected location.

13. A method according to claim 8 wherein the step of altering the temperature is accomplished by acoustically vibrating the fluid at said selected location.

14. An apparatus for detecting and measuring a flow rate of a fluid, comprising:
   (a) a conduit sized and adapted to receive a selected volume of the fluid, said conduit defined by a surrounding sidewall having a portion thereof that is transparent to electromagnetic radiation;
   (b) a sensor operative to detect a temperature gradient of the fluid at a selected location in said conduit;
   (c) a light emitting diode proximate to said conduit and operative to transmit electromagnetic radiation through said portion of said sidewall at a spaced apart location from said sensor;
   (d) an energy-absorbing band disposed on an interior surface of said surrounding sidewall of said conduit at a location aligned with said light-emitting diode and said portion of said sidewall, wherein said energy-absorbing band is operative to increase in temperature when said electromagnetic radiation passes through said portion of said sidewall; and
   (e) a controller operative to generate an on signal and an off signal, said on signal operative to activate said light emitting diode for a first selected duration, and said off signal operative to deactivate said light emitting diode for a second selected duration.

15. An apparatus according to claim 14 wherein said portion of said sidewall is transparent to electromagnetic radiation of a frequency in the visible spectrum and wherein said light emitting diode is operative to transmit electromagnetic radiation of a frequency in the visible spectrum.

16. An apparatus according to claim 14 including a lens disposed between said light emitting diode and said portion of said sidewall, said lens being operative to focus said electromagnetic radiation through said portion of said sidewall towards a region inside said conduit.

17. An apparatus according to claim 14 wherein said energy-absorbing band is formed of a material selected from glassy carbon and ceramic deposited on said interior surface.

18. An apparatus according to claim 14 wherein said surrounding sidewall includes an energy-reflecting band disposed adjacent said energy-absorbing band.

19. An apparatus according to claim 18 wherein said energy-reflecting band is formed by polishing said interior surface of said conduit.

20. An apparatus according to claim 19 including a lens disposed between said light-emitting diode and said portion of said sidewall, said lens being operative to focus said electomagnetic radiation through said portion of said sidewall towards said energy-absorbing band, whereby said light-emitting diode, said lens, said energy-absorbing band and said energy-reflecting band cooperate to heat said fluid in a region adjacent said energy-absorbing band.

21. An apparatus according to claim 20 wherein said light-emitting diode, said lens, said energy-absorbing band and said energy-reflecting band cooperate to heat the fluid by 0.01° C.

22. An apparatus for detecting and measuring a flow rate of a fluid, comprising:
(a) a first panel of a selected dimension, said first panel formed of a material operative to transmit visible light therethrough;
(b) a second panel of a selected dimension;
(c) a gasket disposed between said first and second panel, said gasket having a channel formed therethrough thereby to form a conduit defined by said first panel, said second panel and said gasket, wherein said conduit is sized and adapted to receive a selected volume of the fluid;
(d) an inlet and an outlet adapted to be placed in fluid communication with said conduit, thereby to permit fluid to flow through said inlet, along said conduit and out said outlet;
(e) a light emitting diode proximate to said first panel and operative to transmit visible light therethrough; and
(f) a sensor operative to detect a temperature gradient of the fluid at a selected location in said conduit.

23. A method for detecting and measuring flow of a fluid along a flow path, comprising:
(a) moving the fluid in a downstream direction along a flow path;
(b) heating the fluid at a selected location for a selected duration so as to raise the temperature thereof at the selected location by about 0.01° C., thereby to generate a heat pulse in the fluid, said pulse having a leading edge forming a first temperature gradient and a trailing edge forming a second temperature gradient, said pulse moving in a downstream direction along said flow path; and
(c) monitoring the fluid at a sensing region that is spaced apart and downstream of said selected location, thereby to detect said heat pulse passing through said sensing region.

24. An apparatus for detecting and measuring a flow rate of a fluid, comprising:
(a) a conduit sized and adapted to receive a selected volume of the fluid, said conduit defined by a surrounding sidewall having a portion thereof that is capable of passing energy therethrough;
(b) a sensor element disposed in said conduit;
(c) an energy source proximate to said conduit and operative to transmit energy through said portion of said sidewall at a spaced apart location from said sensor element; and
(d) wherein said surrounding sidewall includes an energy-absorbing portion thereof that is proximate to said spaced apart location.

25. An apparatus according to claim 24 wherein said surrounding sidewall includes an energy-reflecting portion adjacent said energy-absorbing portion.

* * * * *